United States Patent
Hirose et al.

(10) Patent No.: US 7,211,723 B2
(45) Date of Patent: May 1, 2007

(54) PHASE SEPARATION JIG FOR SUPERCONDUCTIVE CABLES AND PHASE SEPARATION STRUCTURE OF SUPERCONDUCTIVE CABLES

(75) Inventors: Masayuki Hirose, Osaka (JP); Hiroyasu Yumura, Osaka (JP); Takeshi Kato, Osaka (JP); Yoshihisa Takahashi, Tokyo (JP); Kimiyoshi Matsuo, Tokyo (JP); Shoichi Honjo, Tokyo (JP); Tomoo Mimura, Toyo (JP)

(73) Assignees: Sumitomo Electric Industries, Ltd., Osaka (JP); The Tokyo Electric Power Company Incorporated, Tokyo (JP)

( * ) Notice: Subject to any disclaimer, the term of this patent is extended or adjusted under 35 U.S.C. 154(b) by 282 days.

(21) Appl. No.: 10/480,260

(22) PCT Filed: Jun. 21, 2002

(86) PCT No.: PCT/JP02/06259

§ 371 (c)(1),
(2), (4) Date: Dec. 18, 2003

(87) PCT Pub. No.: WO03/001638

PCT Pub. Date: Jan. 3, 2003

(65) Prior Publication Data

US 2004/0173365 A1 Sep. 9, 2004

(30) Foreign Application Priority Data

Jun. 22, 2001 (JP) .............................. 2001-190393

(51) Int. Cl.
*H01B 12/00* (2006.01)
(52) U.S. Cl. .................................. 174/15.5
(58) Field of Classification Search ............. 174/251.1, 174/15.5, 15.4; 505/230, 220
See application file for complete search history.

(56) References Cited

U.S. PATENT DOCUMENTS

| | | | | |
|---|---|---|---|---|
| 3,730,968 A | * | 5/1973 | Szente-Varga | 174/27 |
| 3,992,169 A | * | 11/1976 | Loudon | 62/50.7 |
| 4,233,816 A | * | 11/1980 | Hensley | 62/50.7 |
| 6,034,324 A | * | 3/2000 | Dixon et al. | 174/15.4 |
| 6,049,036 A | * | 4/2000 | Metra | 174/15.5 |
| 6,743,984 B2 | * | 6/2004 | Nassi et al. | 174/125.1 |
| 2005/0061537 A1 | * | 3/2005 | Yumura et al. | 174/125.1 |
| 2005/0217878 A1 | * | 10/2005 | Ashibe et al. | 174/15.5 |

FOREIGN PATENT DOCUMENTS

| | | |
|---|---|---|
| JP | 49-37182 | 4/1974 |
| JP | 58-103536 | 7/1983 |
| JP | 60-119827 | 8/1985 |
| JP | 62-85619 | 4/1987 |
| JP | 1-109609 | 4/1989 |
| JP | 09-190847 | 7/1997 |
| JP | 2000-331547 A | 11/2000 |

* cited by examiner

*Primary Examiner*—Dean A. Reichard
*Assistant Examiner*—Ivan Carpio
(74) *Attorney, Agent, or Firm*—Foley & Lardner LLP

(57) ABSTRACT

A phase separation jig (100) for a superconducting cable includes: a cable holder (10) maintaining each core (80) of a multi-core superconducting cable (2) in a predetermined tolerable bending manner; and a coupler (20, 30) holding the cable holder (10) for each core (80) at a predetermined spacing with each other. Each core (80) is spaced apart from each other and maintained in a tolerable bending manner by the holder (10). Accordingly, a phase separation structure can be obtained which can regulate deformation of the cable and prevent abnormal deformation even for a superconducting cable.

8 Claims, 7 Drawing Sheets

PHASE SEPARATION JIG FOR SUPERCONDUCTIVE CABLES AND PHASE SEPARATION STRUCTURE OF SUPERCONDUCTIVE CABLES

TECHNICAL FIELD

The present invention relates to a phase separation jig for a superconducting cable and a phase separation structure of a superconducting cable using the phase separation jig.

BACKGROUND ART

For a normal-temperature cable, a three-core collective-type cable is available. In forming a joint of such a three-phase collective-type cable, twisted phases thereof are loosened into each core to be held at an appropriate spacing with each other and then each separated core is lead to the junction. In this stage, since the normal-temperature cable has a relatively small constraint on bending, such a separation structure can be obtained simply by bending each cable core without using any jig.

Furthermore, for a superconducting cable using a high-temperature superconducting tape wire made of a Bi systems, a three-core collective-type cable has also been developed. In that case, a structure where each core thereof is initially spaced apart and then lead to the joint is required.

However, the high-temperature superconducting cable suffers from much severer bending constraint than the normal-temperature cable because when the high-temperature superconducting wire made of a Bi systems is bent, critical current is lowered. In addition, a large amount of thermal shrinkage of the cable occurring during cooling must be accommodated. Accordingly, if each core thereof is simply bent without using any jig as in the case of the normal-temperature cable, abnormal deformation exceeding the tolerable level can occur during the shrinkage. Therefore, there is a need for a solution to this problem.

Accordingly, a main object of the present invention is to provide a phase separation jig for a superconducting cable which can avoid excessive bending stress imposed on a phase separation section, and an separation structure using the jig.

DISCLOSURE OF THE INVENTION

In the present invention, when a twisted multi-core superconducting cable is loosened into each core, a jig to maintain a bending manner thereof can be used to attain the object mentioned above.

More particularly, a phase separation jig for a superconducting cable in accordance with the present invention includes: a cable holder maintaining each core of the multi-core superconducting cable in a predetermined tolerable bending manner; and a coupler keeping each cable holder for each core at a predetermined spacing with each other.

Since each core (cable core) of the multi-core superconducting cable is spaced apart from each other and a tolerable bending manner thereof is maintained by the holder, a phase separation structure can be obtained by which deformation of the cable core caused by thermal shrinkage during cooling can be regulated to suppress abnormal deformation even for the superconducting cable.

The components of the present invention will be described in detail in the following.

Holder

A holder is a portion which maintains each core of the multi-core superconducting cable in a predetermined tolerable bending manner and may be a tubular element, for example, covering each core. The tubular element is preferably configured to be divided into semi-tubular portions to secure the cable core therein.

Preferably, the holder covers an entire curved section ranging from a point where twisted cable cores are loosened to a point where each cable core is kept at a predetermined spacing with each other. Since bending of the cable core is regulated along the entire curved section, excessive bending which can occur in each cable core during thermal shrinkage is suppressed.

Alternatively, the holder may be configured to cover each of a plurality of sections in the entire curved section in a discrete manner to substantially regulate the bending along the curved section. In this case, increasing the number of the holders can provide an effect substantially equal to that of a single holder covering the entire curved section.

More particularly, two types of configurations are preferably prepared for the holder: a holder which maintains the same cable core arrangement as that prior to phase separation; and a holder which provides a cable core arrangement different from that prior to phase separation. With this configuration, the phase arrangement of the superconducting cable core can be set to conform to the phase placement of the device and equipment to which the superconducting cable is connected.

The superconducting cable is connected especially at a termination to transmission and substations equipment such as an overhead wire and a gas insulated switch gear (GIS). The phase arrangement of such equipment is generally determined. In order to accommodate the phase arrangement, the phase arrangement of the cable must be matched. Furthermore, since the superconducting cable is generally enclosed in a double-walled container to be cooled, it will be much costly to design such a double-walled container for each phase arrangement. Therefore, the phase of the superconducting cable can be arranged by the phase separation jig to match that of the equipment easily.

For example, the holder which maintains the same cable core arrangement as that prior to phase separation is a holder which maintains the same cable core arrangement in an order of first, second and third phases clockwise before and after phase separation. The holder which provides a cable core arrangement different from that prior to phase separation is a holder which has a cable core arrangement in an order of first, second and third phases clockwise though the cable core arrangement before phase separation is in an order of first, third and second phases.

In addition, the holder tightens a cable core therein to avoid displacement. In tightening, a tightening band and the like wound around the outer periphery of the holder can be used.

Furthermore, the holder is preferably provided with a plurality of coolant passage holes. The phase separation structure fixed by the jig of the present invention is entirely enclosed in a branch casing filled with a coolant such as liquid nitrogen. In that case, the coolant is introduced inside the holder through the coolant passage holes to be brought into direct contact with the cable core to provide much more effective cooling.

Coupler

A coupler keeps each holder maintaining a cable core at a predetermined spacing with each other. For example, the coupler is configured to have an annular element to fix each holder at the circumference thereof at a predetermined spacing with each other.

Since the spacing between each of cable cores is gradually increased from a twisted state, a plurality of types of couplers of different sizes are preferably prepared to conform to the different spacing between each of cable cores which are kept by the holders. More particularly, a coupler of smaller radius may be used at a point where the twisted cable cores start to be loosened, and then a coupler of larger radius may be used at a point where each core is kept at a sufficient spacing with each other. The plurality of couplers of different sizes are arranged in the axial direction of the cable to form the phase separation structure.

When the holder covering the entire curved section ranging from the point where twisted cable cores are loosened to the point where each cable core is held at a predetermined spacing with each other is used, smaller number of couplers may be used. On the contrary, when the holder covering each of a plurality of sections in the curved section in a discrete manner is used, larger number of couplers are arranged in the axial direction of the cable core to substantially regulate the bending of the curved section.

When a long holder is used, adjacent couplers can be connected by the holder itself. In contrast, when short holders are used, adjacent couplers are connected with each other by another connecting member different from the holder.

Sliding Portion

A sliding portion is preferably provided to support the coupler in a freely slidable manner relative to the branch casing covering the outer periphery of the coupler. With the cable cores maintained, the jig of the present invention including the holder and the coupler described above is placed in the branch casing and cooled by the coolant. Thermal shrinkage during cooling involves significant displacement. In order to accommodate the thermal shrinkage, the sliding portion is provided to slide the holder and the coupler smoothly in the branch casing.

For the sliding portion, any configuration may be adopted as long as it can smoothly slide the coupler relative to the branch casing. However, since the jig of the present invention is immersed in a cryogenic coolant, the sliding portion is preferably configured without any moving portion. For example, the sliding portion is preferably made of a material of low coefficient of friction and configured to be a protrusion, rather than a roller, allowing a point contact with an inner surface of the branch casing.

Phase Separation Structure

The phase separation jig described above separates the multi-core superconducting cable into respective cable cores. Furthermore, the cable cores maintained in a predetermined bending manner and held at a predetermined spacing with each other by the phase separation jig are surrounded by a branch casing filled with a coolant. The branch casing can then be covered with an evacuated heat insulating layer to form the phase separation structure.

BEST MODES FOR CARRYING OUT THE INVENTION

The best modes for carrying out the invention will be described in the following in connection with the drawings.

General Configuration

Figure 1:
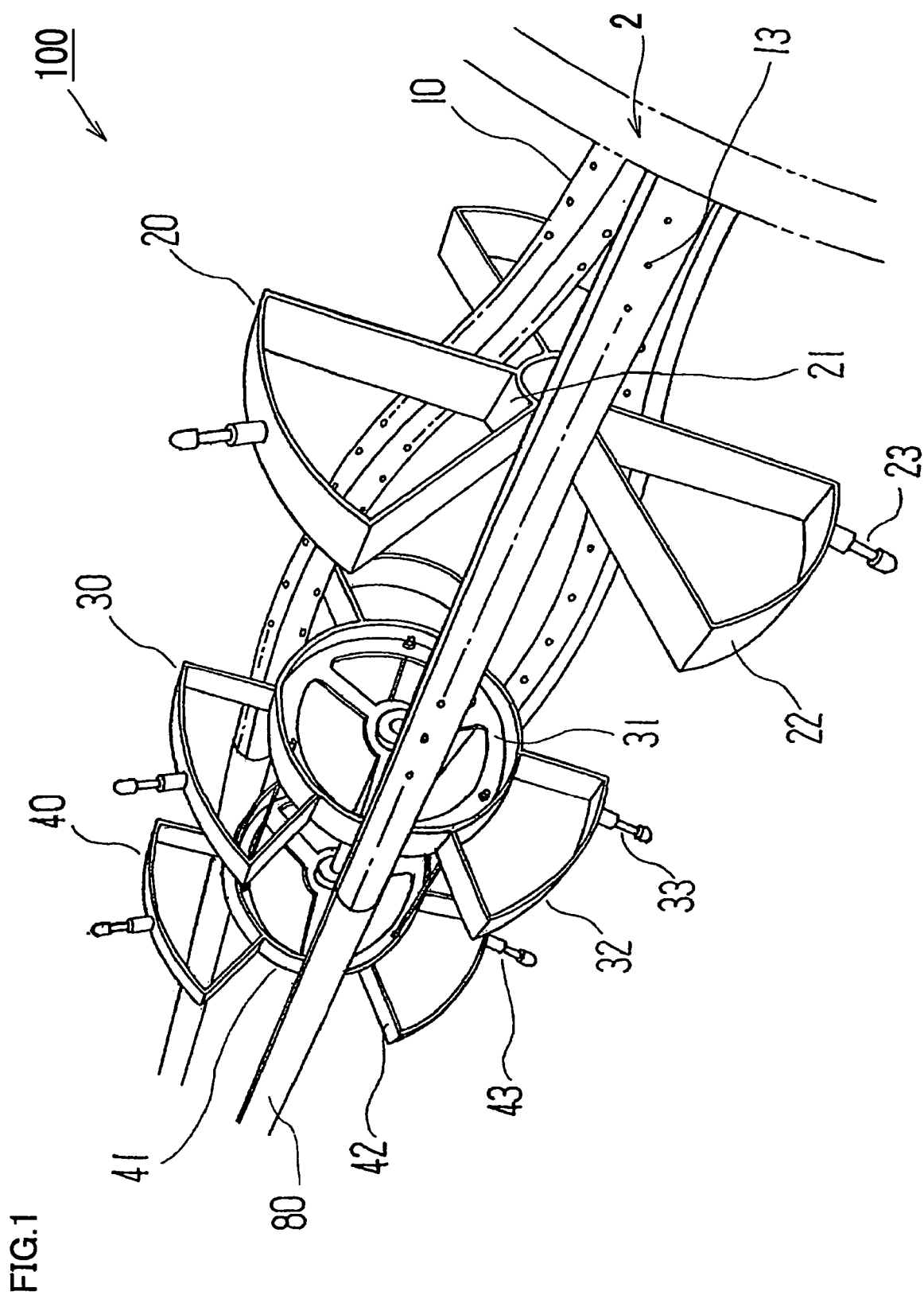
FIG. 1 is a perspective view of a superconducting cable held by a phase separation jig of the present invention.
Figure 2:
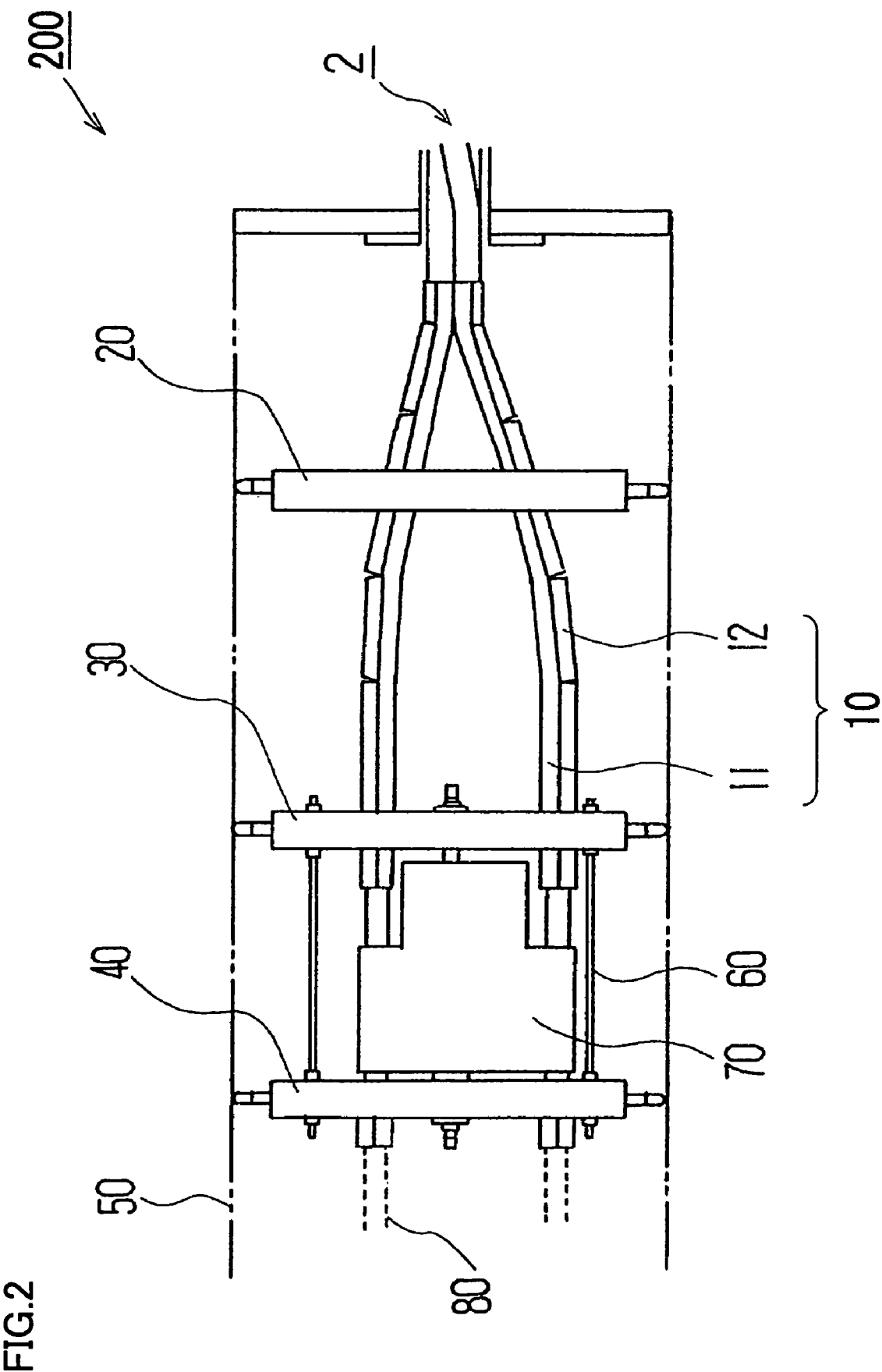
FIG. 2 is a schematic view of a phase separation structure of the present invention.

Referring FIGS. 1 and 2, a phase separation jig 100 of the present invention spreads open a twisted three-core collective-type superconducting cable 2 into respective cable cores such that each cable core 80 is maintained at a predetermined spacing with each other in a predetermined bending manner. Phase separation jig 100 includes: a holder 10 keeping each cable core 80; and a first coupler 20 and a second coupler 30 fixing each holder 10 at a predetermined spacing with each other. In the embodiment, two couplers of different radii are connected with three holders 10. Furthermore, a spacer 40 is used in phase separation jig 100 to form a short-circuited shield portion 70 for each phase between second coupler 30 and spacer 40. In a phase separation structure 200 of the present invention, each cable core 80 phase-separated by the jig is placed in a casing 50 filled with a coolant. In the configuration above of the present embodiment, three-core collective-type superconducting cable 2 corresponds to a multi-core superconducting cable, cable core 80 corresponds to each core, casing 50 corresponds to a branch casing, first coupler 20 and second coupler 30 correspond to a coupler, and holder 10 corresponds to a cable holder.

Holder

Holder 10 is a curved metal tube serving to cover each cable core 80. Each cable core 80, which is twisted with each other, is loosened to be spread at a predetermined spacing with each other forming a gentle S-shaped curve. In that case, the curved section is formed at a tolerable bending radius. The curved section can be entirely covered with holder 10 in the form of a metal tube to maintain a bending manner along the curved section even in thermal shrinkage of the cable core. Accordingly, an excessive bending which may occur in the cable core can be prevented. Herein, holder 10 has a bending radius of 1000 mm and an internal diameter of 42 mm, and is made of stainless steel.

In the embodiment, as shown in FIG. 2, holder 10 is configured by a single trough-like element 11 connecting first coupler 20 and second coupler 30, and a plurality of semi-tubular elements 12 which, together with trough-like element 11, enclose cable core 80 therebetween. Trough-like element 11 integrates first coupler 20 and second coupler 30 in a single unit. Furthermore, a plurality of semi-tubular elements 12 can be juxtaposed in a longitudinal direction of the cable core to form with trough-like element 11 a tube of the same length as trough-like element 11, which can cover an outer periphery of cable core 80.

Holder 10 is provided with a plurality of coolant passage holes 13 (FIG. 1) in series in the longitudinal direction. Since holder 10 enclosing each cable core 80 is immersed in a coolant such as liquid nitrogen, the coolant is introduced into holder 10 through coolant passage holes 13 to cool each cable core 80 more efficiently.

Furthermore, a metal band (not shown) is attached to the outer periphery of holder 10 to tighten such that each cable core 80 is secured without displacement.

Coupler

Figure 3:
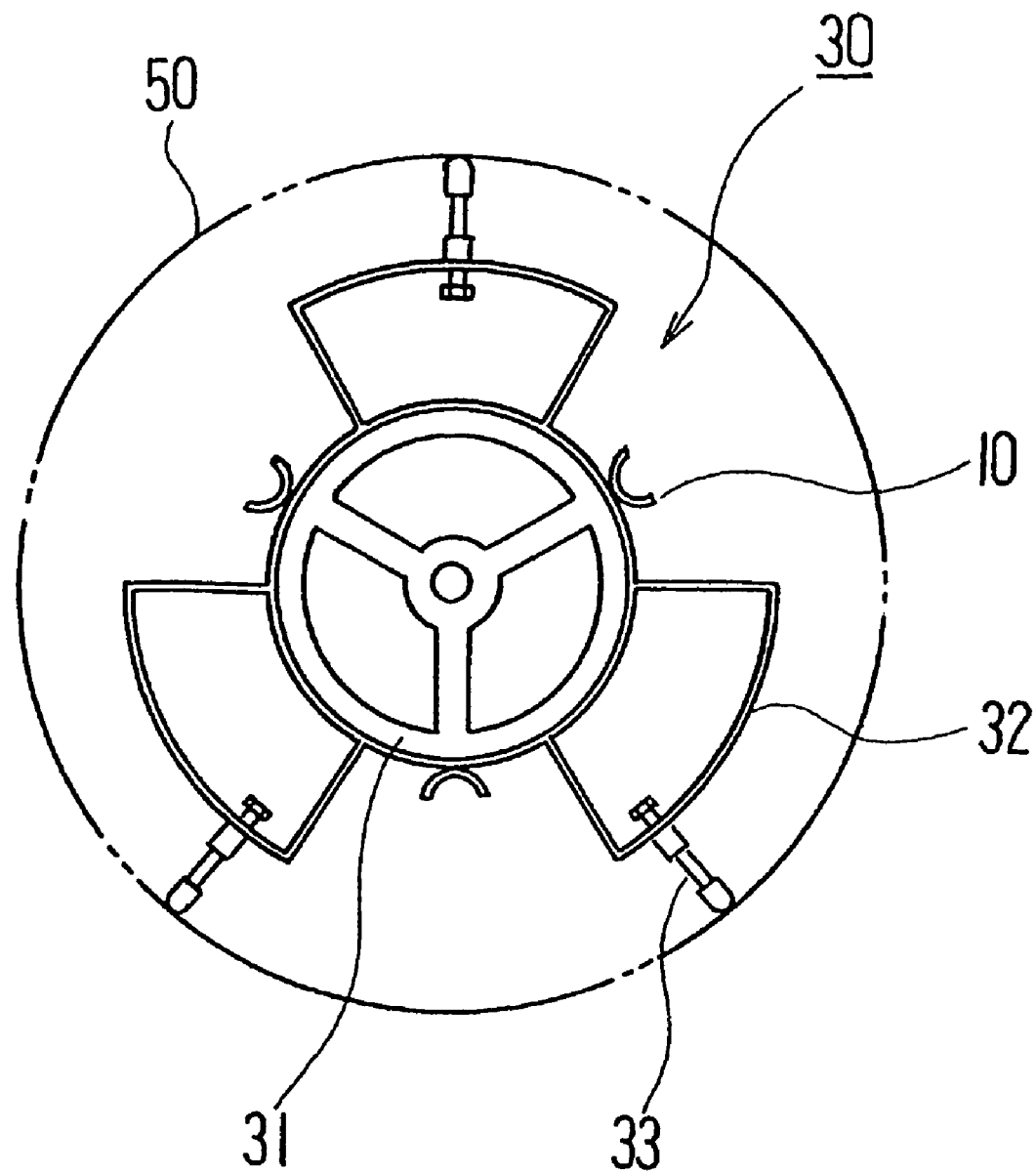
FIG. 3 is a plan view of a first coupler in the phase separation jig of the present invention.
Figure 4:
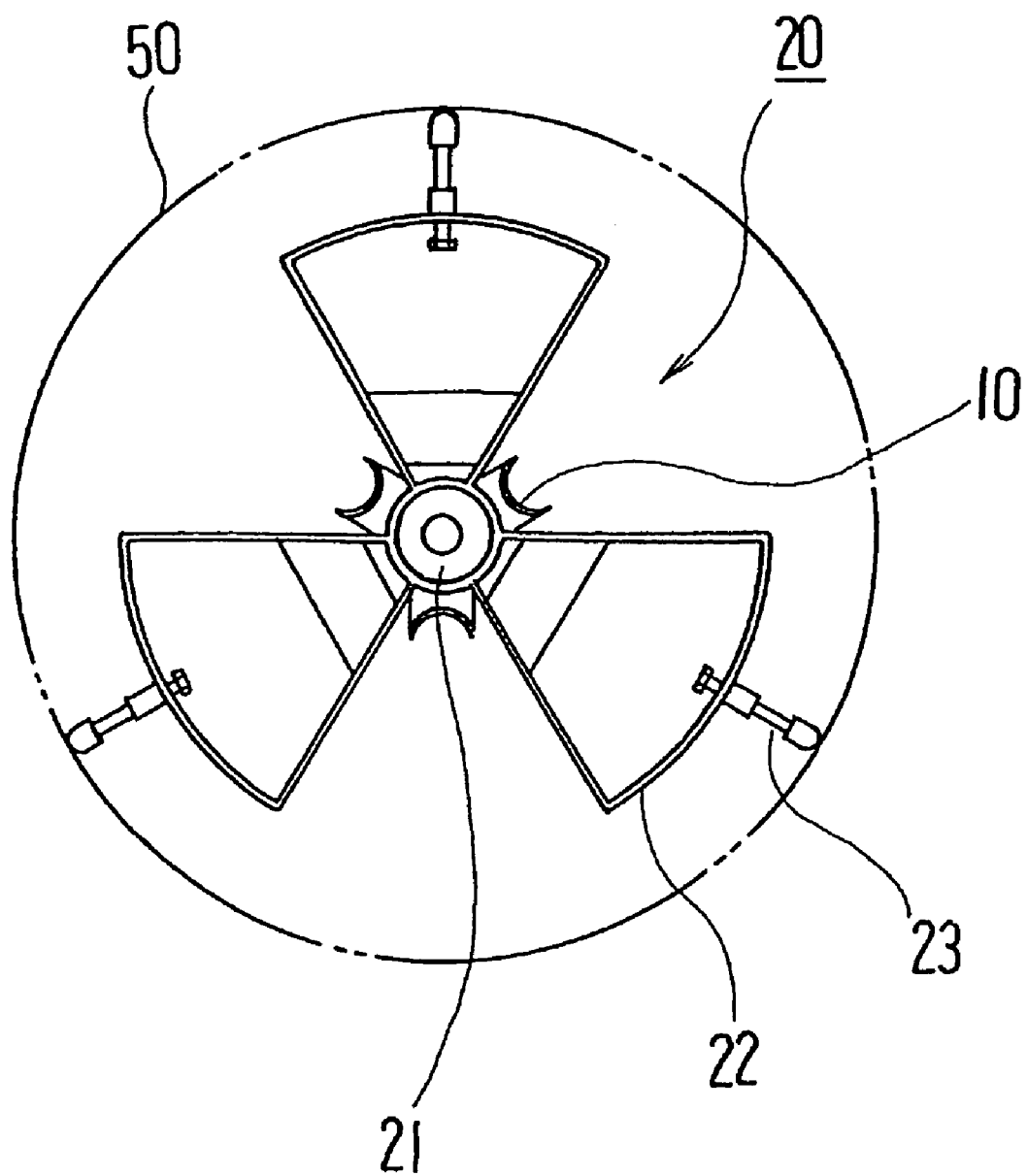
FIG. 4 is a plan view of a second coupler in the phase separation jig of the present invention.

Couplers 20 and 30 serve to hold three holders 10 described above at a predetermined spacing, and respectively include: annular elements 21 and 31 integrated with holder 10; sector-shaped frames 22 and 32 extending radially from annular elements 21 and 31, respectively; and sliding portions 23 and 33 formed at a curved outer periphery of sector-shaped frames 22 and 32, respectively. In the embodiment, first coupler 20 and second coupler 30 are used as shown in FIGS. 3 and 4.

First coupler 20 fixes at an outer periphery of annular element 21 each holder 10 at a point where the twisted cable cores are somewhat loosened. Furthermore, second coupler 30 fixes at an outer periphery of annular element 31 each holder 10 at a point where each cable core is held at a sufficient spacing with each other. Accordingly, annular element 31 of second coupler 30 is formed to have larger outer diameter than annular element 21 of first coupler 20.

At outer peripheries of the annular elements 21 and 31 where holder 10 does not exist, three sector-shaped frames 22 and 32 are respectively formed. Sector-shaped frames 22 and 32 serve to hold annular elements 21 and 31 respectively in a coaxial manner in casing 50 which will be described below. Accordingly, in first coupler 20 and second coupler 30, sector-shaped frames 22 and 32 have a common outer diameter.

At curved peripheries of sector-shaped frames 22 and 32, sliding portions 23 and 33 are respectively formed to contact an inner surface of casing 50. In thermal shrinkage of the cable, sliding portions 23 and 33 enable phase separation jig 100 to slide smoothly in casing 50 with each cable core 80 maintained in a predetermined bending manner. Sliding portions 23 and 33 are configured such that a protrusion made of fluorocarbon resin is provided at the tip of a bolt which penetrates each of sector-shaped frames 22 and 23. The tip of the protrusion is formed to have a spherical shape, which substantially allows point contact with the inner surface of casing 50.

In thermal shrinkage of the cable, couplers 20 and 30 also rotate slightly in a circumferential direction since three-core collective-type superconducting cable 2 is formed of three twisted cores. However, the rotation direction of each cable core 80 after phase separation is fixed at an end of casing 50. Accordingly, when an excessive rotation occurs at couplers 20 and 30, each cable core 80 will be excessively deformed. In order to accommodate the rotation in the circumferential direction of couplers 20 and 30, a stopper is preferably provided to control rotation angle thereof. For the stopper, a protrusion may be provided at an inner surface of casing 50 to restrict the movement of sliding portions 23 and 33 to a predetermined range in a circumferential direction.

Spacer

Furthermore, as shown in FIG. 2, a spacer 40 is arranged on a distal side of second coupler 30. A short-circuited shield portion 70 for each phase is formed between spacer 40 and second coupler 30. Spacer 40 substantially has the same configuration as that of second coupler 30 except for the shorter holder, and includes a sliding portion 43 similar to that of first coupler 20 and second coupler 30. In thermal shrinkage of the cable core, sliding portion 43 slides smoothly in an axial direction of the cable core in casing 50. Furthermore, spacer 40 is integrated with second coupler 30 by a connecting bolt 60.

Each phase-separated cable core 80 is kept at a predetermined spacing with each other by spacer 40 through short-circuited shield portion 70. Each cable core 80 is then connected to a terminal portion, various devices, transmission and substations equipment (not shown), or the like.

Coolant Tank and Evacuated Layer

Each cable core 80 held by phase separation jig 100 has its outer periphery covered with casing 50 (FIG. 2) serving as a coolant tank, and casing 50, in turn, has its outer periphery covered with an evacuated layer (not shown) serving as a thermal insulating layer. Casing 50 is a tubular container filled with a coolant such as liquid nitrogen.

Superconducting Cable

Figure 5:
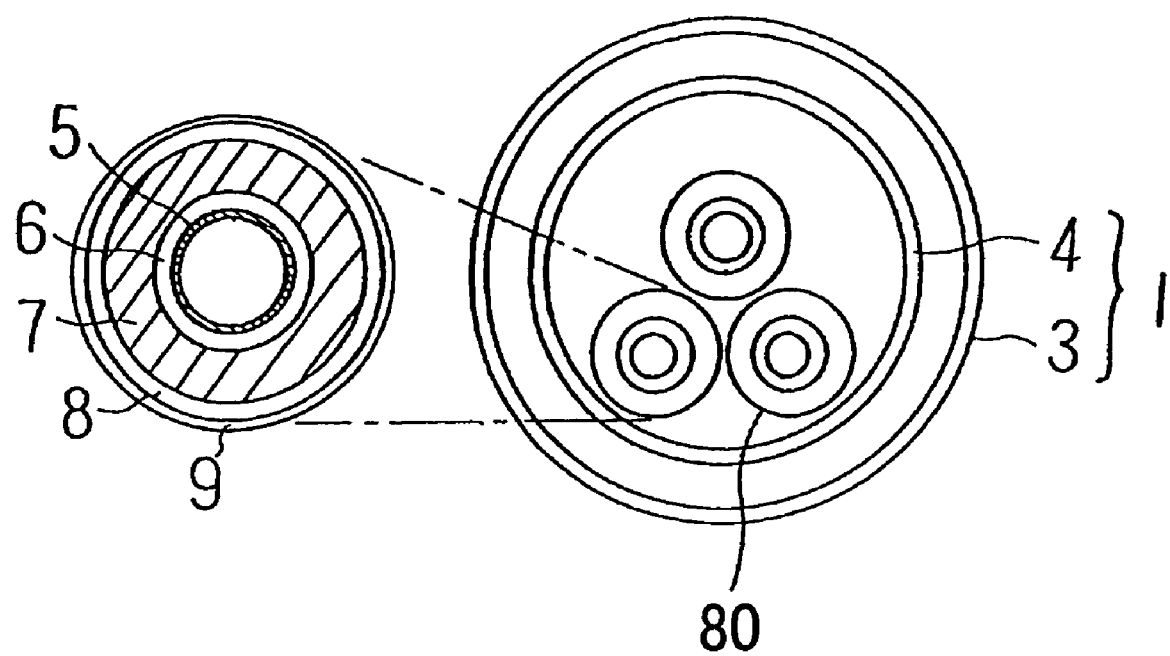
FIG. 5 is a cross section of a three-core collective-type superconducting cable held by the phase separation jig of the present invention.

For the phase separation structure, a superconducting cable as shown in FIG. 5 can be used. The superconducting cable has a structure in which three twisted cable cores 80 are placed in a heat insulating tube 1.

Heat insulating tube 1 is configured to have a superinsulation in a double-walled tube, i.e., between an outer tube 3 and an inner tube 4. In addition, the double-walled tube is evacuated. In each cable core 80, a former 5, a superconducting conductor 6, an electrical insulating layer 7, a shield layer 8, and a protective layer 9 are successively formed from the center portion. Former 5 is preferably a twisted wire made of small-radius insulating Cu wires in view of mechanical strength and alternating current loss. Superconducting conductor 6 is configured to have superconducting wire material wound on former 5 in a spiral manner to form a plurality of layers. Shield layer 8 is also configured to have the similar superconducting wire material wound on electrical insulating layer 7 in a spiral manner. Space around each cable core 80 inside heat insulating tube 1 serves as a passage of the coolant.

Phase Arrangement of Holder

Figure 6B:
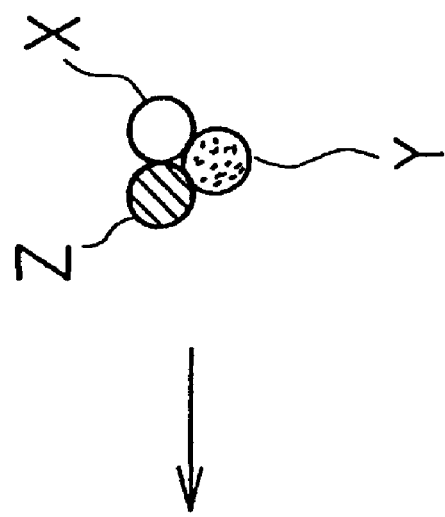
FIG. 6B is an explanatory view showing respective arrangements of the superconducting cable cores before and after phase separation.
Figure 6A:
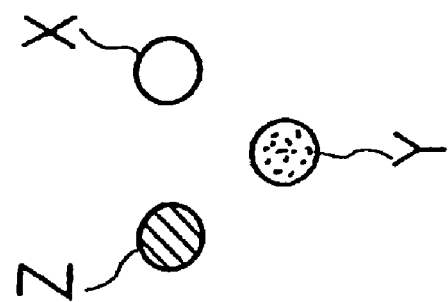
FIG. 6A is a perspective view showing a configuration of a holder in the phase separation jig of the present invention.
Figure 6A:
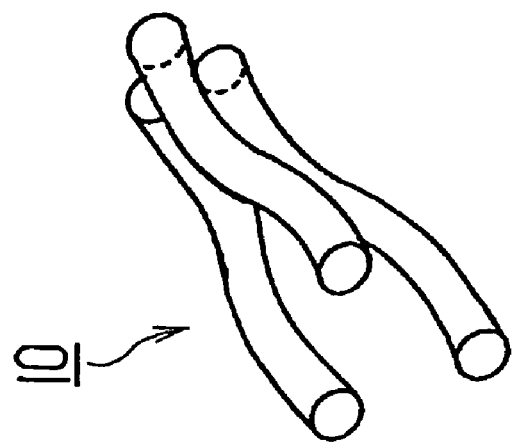

In the description above, the phase separation structure which has the same phase arrangement as that prior to phase separation has been discussed. More particularly, as shown in FIG. 6A, each holder 10 merely extends with each spacing gradually increased from one end to the other end, and does not intersect each other. Accordingly, as shown in FIG. 6B, twisted phases before phase separation are in an order of core X, core Y and core Z clockwise. After phase separation, the phases are still in an order of core X, core Y and core Z clockwise.

Figure 7B:
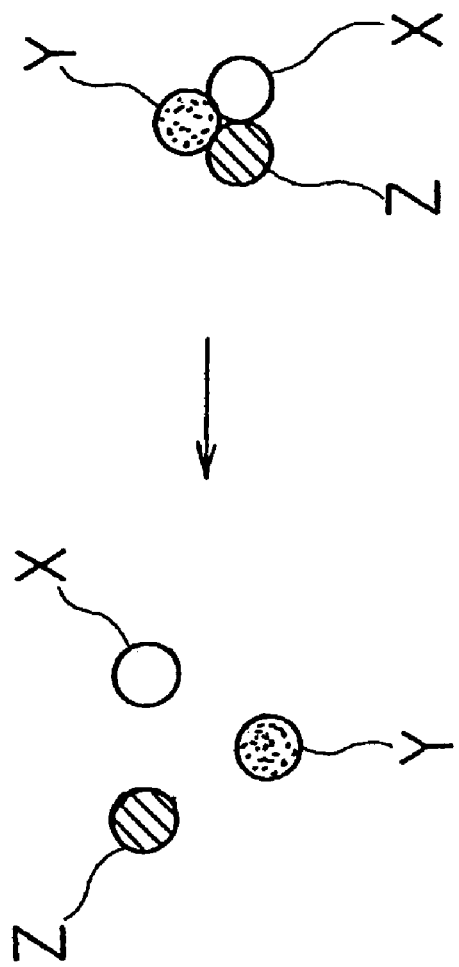
FIG. 7B is an explanatory view showing respective arrangements of the superconducting cable cores before and after phase separation.
Figure 7A:
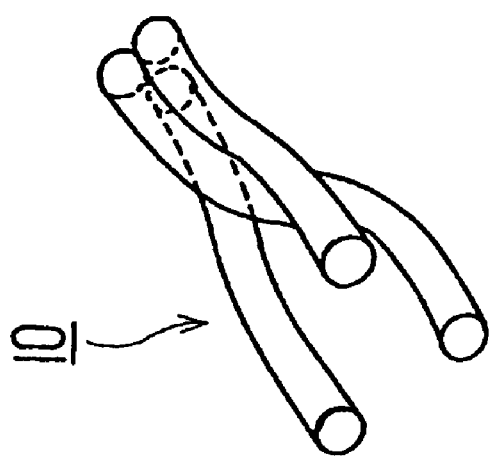
FIG. 7A is a perspective view showing a configuration of the holder in the phase separation jig of the present invention.

On the contrary, each holder 10 as shown in FIG. 7A is configured to intersect each other. Accordingly, as shown in FIG. 7B, twisted phases before phase separation are in an order of core X, core Z and core Y clockwise whereas twisted phases after phase separation are in an order of core X, core Y and core Z clockwise.

As such, when a plurality of types of phase separation jigs which have holders with different phase arrangements are prepared, a suitable jig can be selected for use to accommodate respective phase arrangements of the super conducting cable and of the device and equipment which the cable is to be connected to after phase separation.

INDUSTRIAL APPLICABILITY

The phase separation jig for the superconducting cable and the phase separation structure of the superconducting cable according to the present invention are used to hold each core of a twisted multi-core superconducting cable at an appropriate spacing with each other in order to connect the core to a phase transforming equipment and the like.

The invention claimed is;

1. A phase separation jig for a multi-core superconducting cable, said multi-core superconducting cable having a plurality of cores, the phase separation jig comprising:
    a plurality of cable holders, each cable holder of the plurality of cable holders maintaining a corresponding core of the plurality of cores in a predetermined tolerable bending manner; and
    a coupler holding said plurality of cable holders at a predetermined spacing with respect to each other;
    wherein each cable holder of the plurality of cable holders covers an entire curved section of the corresponding core ranging from a point where the corresponding core separates from other cores of the plurality of cores to a point where the corresponding core is kept substantially at said predetermined spacing with respect to the other cores.

2. The phase separation jig according to claim 1, further comprising:
    a sliding portion supporting in a slidable manner said coupler relative to a branch casing covering an outer periphery of said coupler.

3. The phase separation according to claim 1, wherein a plurality of said couplers arranged in a longitudinal direction of each core of the plurality of cores are integrated by said plurality of holders.

4. A phase separation structure of a superconducting cable, separating and holding a multi-core superconducting cable with the phase separation jig defined in claim 1, said multi-core superconducting cable being placed in a branch casing.

5. The phase separation jig according to claim 1,
    wherein said coupler has an annular element, and
    wherein the plurality of cable holders are fixed at an outer periphery of said annular element with the predetermined spacing between each of the plurality of cable holders provided in a circumferential direction of said annular element.

6. The phase separation jig according to claim 5, wherein a plurality of said couplers arranged in a longitudinal direction of each core of the plurality of cores have annular elements having outer diameters different from each other, respectively.

7. A phase separation jig for a superconducting cable comprising:
    a cable holder maintaining each core of a multi-core superconducting cable in a predetermined tolerable bending manner; and
    a coupler holding said cable holder for each core at a predetermined spacing with each other;
    wherein said coupler has an annular element, and
    wherein a plurality of said cable holders are fixed at an outer periphery of said annular element with a spacing provided in a circumferential direction of said annular element with each other.

8. The phase separation jig for a superconducting cable according to claim 7, wherein a plurality of said couplers arranged in a longitudinal direction of each core have annular elements having outer diameters different from each other, respectively.

* * * * *